(12) United States Patent
Endo

(10) Patent No.: US 6,751,538 B2
(45) Date of Patent: Jun. 15, 2004

(54) CONTROLLER FOR MOTOR POWER STEERING SYSTEM

(75) Inventor: Shuji Endo, Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/048,010

(22) PCT Filed: May 14, 2001

(86) PCT No.: PCT/JP01/03982

§ 371 (c)(1),
(2), (4) Date: Jan. 25, 2002

(87) PCT Pub. No.: WO01/89911

PCT Pub. Date: Nov. 29, 2001

(65) Prior Publication Data

US 2003/0120404 A1 Jun. 26, 2003

(30) Foreign Application Priority Data

May 25, 2000 (JP) ......................................... 2000-154284

(51) Int. Cl.[7] .............................. B62D 6/00; G06F 7/00; G06F 19/00
(52) U.S. Cl. .......................... 701/41; 180/446; 318/434
(58) Field of Search ............................. 701/41, 42, 36; 318/432, 433, 434; 180/400, 446, 447, 443

(56) References Cited

U.S. PATENT DOCUMENTS

| | | | | |
|---|---|---|---|---|
| 4,492,195 A | * | 1/1985 | Takahashi et al. | 123/339.11 |
| 5,257,828 A | * | 11/1993 | Miller et al. | 180/446 |
| 5,732,373 A | * | 3/1998 | Endo | 701/42 |
| 5,740,040 A | * | 4/1998 | Kifuku et al. | 701/41 |
| 6,013,994 A | * | 1/2000 | Endo et al. | 318/432 |
| 6,407,524 B1 | * | 6/2002 | Endo et al. | 318/432 |
| 6,426,602 B1 | * | 7/2002 | McCann et al. | 318/432 |

* cited by examiner

Primary Examiner—Thomas G. Black
Assistant Examiner—Ronnie Mancho
(74) Attorney, Agent, or Firm—Sughrue Mion, PLLC

(57) ABSTRACT

In a control unit for an electric power steering apparatus, a mechanical system and a control system are designed to match a desirable complementary sensitivity function, and the steering is improved to obtain stable and comfortable steering feeling. For this purpose, there is provided a control unit for an electric power steering apparatus that controls a motor for giving steering auxiliary force to a steering mechanism based on a current control value calculated from a steering auxiliary command value calculated based on the steering torque generated in the steering shaft, and a current value of the motor. In this control unit, the complementary sensitivity function relative to a frequency is set to a level that approaches 1 in a band in which disturbance to be suppressed exists, and is set to a level that approaches 0 in a band in which disturbance to be transmitted exists.

3 Claims, 24 Drawing Sheets

$$T(s) = \frac{C(s)P(s)}{1 + C(s)P(s)}$$

HPS

EPAS

PHASE COMPENSATION

APPROXIMATE DIFFERENTIATION

PHASE COMPENSATION + APPROXIMATE DIFFERENTIATION

FIG. 21

| VEHICLE SPEED (Km/H) | GAIN | | HIGH/LOW THRESHOLD VALUE |
|---|---|---|---|
| | LOW STEERING TORQUE | HIGH STEERING TORQUE | |
| 0 - 2 | 48 | 48 | ABOUT 5.5 Nm |
| 4 - 78 | 52 | 52 | ABOUT 4.1 Nm |
| 80 - | 48 | 45 | ABOUT 2.5 Nm |

BASIC ASSIST CHARACTERISTIC

VEHICLE SPEED INTERPOLATION COEFFICIENT

CONTROLLER FOR MOTOR POWER STEERING SYSTEM

TECHNICAL FIELD

The present invention relates to a control unit for an electric power steering apparatus that provides steering auxiliary force by motor to the steering system of an automobile or a vehicle. The invention particularly relates to a control unit for an electric power steering apparatus in which a desirable complementary sensitivity function is obtained, and a mechanical system and a control system are designed based on the complementary sensitivity function.

BACKGROUND ART

An electric power steering apparatus that applies auxiliary load to the steering apparatus of an automobile or a vehicle with turning effort of a motor applies the driving force of the motor to a steering shaft or a rack axis based on a transmission mechanism like gears or belts via a reduction gear. Such a conventional electric power steering apparatus carries out a feedback control of a motor current for accurately generating an assist torque (a steering auxiliary torque). The feedback control is for adjusting a motor application voltage so as to minimize a difference between a current control value and a motor current detection value. The motor application voltage is generally adjusted based on a duty ratio of a PWM (Pulse Width Modulation) control.

Approximately ten years have passed since the electric power steering apparatus appeared in the market, and the application of this apparatus has now been expanded to a vehicle class of 2,000 cc. At the same time, high-level performance of the steering apparatus has also been required. Recently, not only the performance of the electric power steering apparatus has reached the performance level of the conventional hydraulic power steering apparatus, new functions of the electric power steering apparatus have been developed, aiming at the advent of new value-added products.

A general structure of the electric power steering apparatus will be explained below with reference to FIG. 28. A shaft of a steering wheel is connected to a tie rod of running wheels through a torsion bar, a reduction gear, universal joints, etc. The shaft of the steering wheel is provided with a torque sensor for detecting a steering torque of the steering wheel. A motor for assisting the steering force of the steering wheel is connected to the shaft through a clutch (not shown) and the reduction gear. A control unit (ECU) for controlling the power steering apparatus is supplied with power from batteries through an ignition key (not shown). The control unit calculates a steering auxiliary command value I of an assist command based on a steering torque T detected by the torque sensor and a vehicle speed V detected by a vehicle speed sensor (not shown). The control unit then controls a current to be supplied to the motor based on the calculated steering auxiliary command value I. In FIG. 28, SAT represents a self-aligning torque.

The control unit is mainly composed of a CPU. FIG. 29 shows general functions to be executed based on a program inside the CPU.

Functions and operation of the control unit 30 will be explained below. A steering torque T detected by the torque sensor 10 and then input is phase-compensated by the phase compensator 31 for increasing the stability of the steering system. The phase-compensated steering torque TA is input to a steering auxiliary command value calculator 32. A vehicle speed V detected by the vehicle speed sensor 12 is also input to the steering auxiliary command value calculator 32. The steering auxiliary command value calculator 32 calculates a steering auxiliary command value I as a control target value of a current to be supplied to the motor 20, based on the input steering torque TA and the input vehicle speed V. The steering auxiliary command value I is input to a subtracter 30A, and is also input to a differential compensator 34 of a feedforward system for increasing a response speed. A difference (I−i) calculated by the subtracter 30A is input to a proportional calculator 35, and is also input to an integration calculator 36 for improving the characteristic of a feedback system. Outputs from the differential compensator 34 and the integration calculator 36 are input to and added together by an adder 30B. A result of the addition by the adder 30B is obtained as a current control value E, and this is input to a motor driving circuit 37 as a motor driving signal. A motor current value i of the motor 20 is detected by a motor current detecting circuit 38, and this motor current value i is input to the subtracter 30A and is fed back.

FIG. 30 is a block diagram showing the transmission function of the electric power steering apparatus. In the drawing, "s" represents a Laplace operator.

Particularly, the electric power steering apparatus has an advantage that it is possible to process information from the road surface and transfer the information to the driver to facilitate the driving, by utilizing the degree of freedom of designing the information. From FIG. 28 and FIG. 30, it can be understood that the sensitivity designing of the road information can be handled as a subject of defining a desirable transmission characteristic from the input of the road surface information to the delivery of the information to the steering torque.

In the mean time, the steering feeling desirable for the driver is realized by tuning the transmission characteristic from the steering angle to the steering torque. In general, the demand for clear steering wheel or quiet steering feeling depends greatly on this transmission characteristic. It can be understood from the schematic block diagram shown in FIG. 30 that these two specifications are in the trade off relationship. For example, this corresponds to a case where the driver feels friction in the steering as a result of the addition of friction to the power steering system in order to lower the sensitivity to the wheel flutter that occurs during a high-speed running of the vehicle.

In the field of the electric power steering apparatus, there has been demanded an advent of a product of which performance exceeds that of the hydraulic power steering apparatus while satisfying the performance of the electric power steering apparatus. Further, this product is desired to obtain stable and comfortable steering wheel, based on the designing of a control system and an electric control system that match the desirable complementary sensitivity function based on the road information.

The present invention has been made in the light of the above situations. It is an object of the present invention to provide a control unit for an electric power steering apparatus in which a desirable complementary sensitivity function is obtained, and a control system is designed to match this complementary sensitivity function.

DISCLOSURE OF THE INVENTION

The present invention provides a control unit for an electric power steering apparatus that controls a motor for giving steering auxiliary force to a steering mechanism based on a current control value calculated from a steering auxiliary command value calculated based on the steering torque generated in the steering shaft, and a current value of the motor. The object of the present invention can be achieved based on the arrangement that the complementary sensitivity function relative to a frequency is set to a level that approaches 1 in a band in which disturbance to be suppressed exists, and is set to a level that approaches 0 in a band in which disturbance to be transmitted exists.

Further, the object of the present invention can be achieved more effectively by the following arrangement. An eigenvalue of the power steering apparatus, an eigenvalue of suspension, and a flutter oscillation area and a motor torque ripple area are included in the band in which the disturbance to be suppressed exists. Alternatively, the eigenvalue of the power steering apparatus is set to 10 to 13 Hz, the eigenvalue of suspension is set to 13 to 17 Hz, the flutter oscillation area is set to 15 to 25 Hz, and the motor torque ripple area is set to 15 to 30 Hz. Alternatively, the complementary sensitivity function is obtained from a design of a mechanical control system and an electric control system. Alternatively, the mechanical control system is obtained from designs of a rolling-type rack and pinion mechanism, a rubber damper of a motor reduction gear mechanism, and a non-contact torque sensor.

BRIEF DESCRIPTION OF THE DRAWINGS

FIG. 21 is a diagram showing an example of a vehicle speed and a setting of gain based on a steering torque.

BEST MODE FOR CARRYING OUT THE INVENTION

Figure 1:
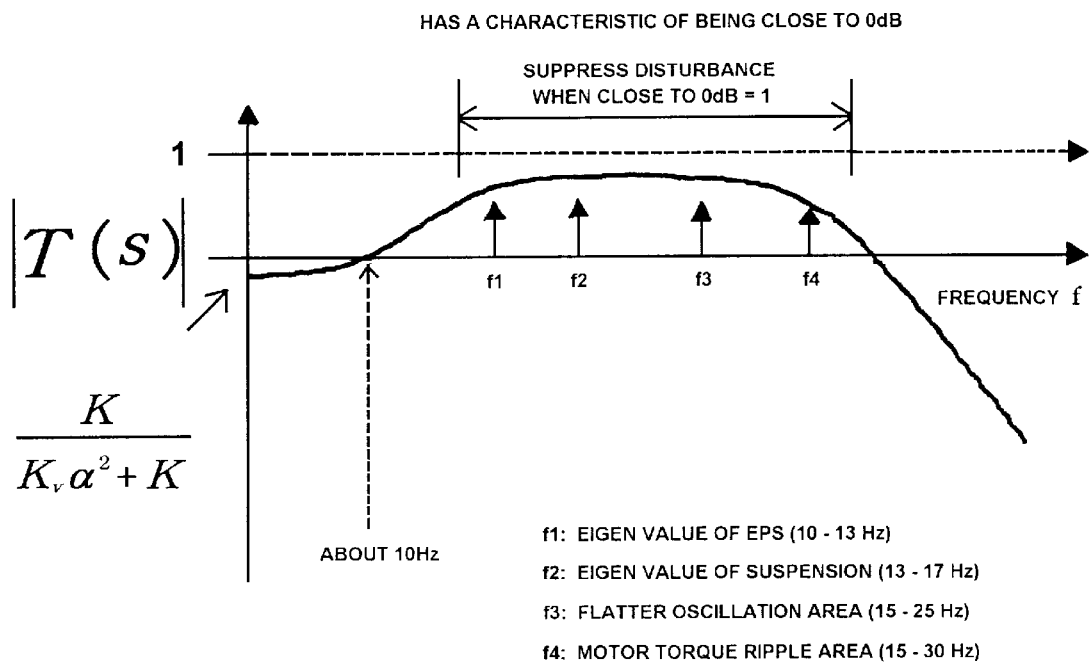
FIG. 1 is a characteristic diagram showing a desirable complementary sensitivity function.

According to an electric power steering, there exists an electric motor that does not exist in a hydraulic power steering, in the middle of transmitting road information to the driver. The friction and inertia of the motor block almost all road surface information. Thus, the electric power steering has a structure that does not easily transmit the road information to the driver. On the other hand, the electric power steering has an advantage that the existence of the motor interrupts unnecessary disturbance. The present inventor has been engaged in the study of an electric power steering apparatus for many years, and has found that the road information can be broadly divided into necessary information and unnecessary information that should be suppressed as disturbance, as shown in FIG. 1. Namely, a complementary sensitivity function T (s) in relation to the frequency that the driver senses is always equal to or lower than 1. The complementary sensitivity function T (s) has a flat linear characteristic close to 0 dB=1, in the area in which there exist an eigen frequency (10 Hz to 13 Hz) of the electric power steering apparatus, and an eigen frequency (13 Hz to 17 Hz) of a suspension, and in a wheel flutter oscillation area (15 Hz to 25 Hz) and a motor torque ripple area (15 Hz to 30 Hz). In other areas, the complementary sensitivity function T (s) has an inclined characteristic coming close to zero.

Figure 30:
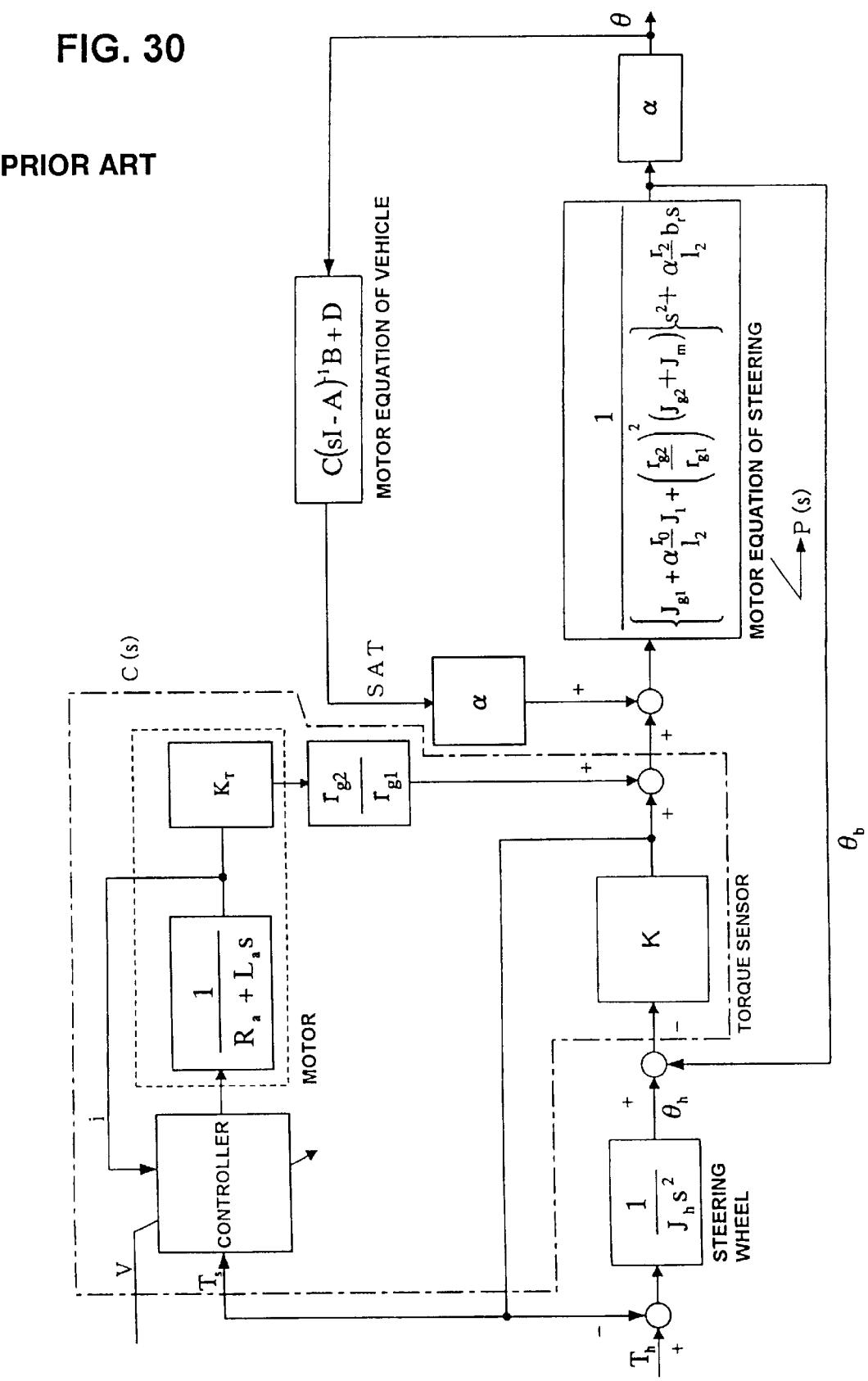
FIG. 30 is a block diagram showing a transmission function of the control unit.

The electric power steering apparatus can be designed on a frequency area, and therefore, it is possible to solve the trade off by distinguishing it on the frequency area of the complementary sensitivity function in FIG. 30. In other words, according to a satisfactory steering, it is possible to suppress unnecessary disturbance, and transmit necessary disturbance to the steering wheel. According to the conventional hydraulic power steering, for example, this point is coped with by adjusting the friction in the steering system. However, it is not possible to satisfy both at the same time. On the other hand, according to the electric power steering, it is possible to define the transmission characteristic from the road surface to the steering wheel. Therefore, it is possible to solve the trade off in the frequency area. Specifically, the complementary sensitivity function T (s) of the control system is set close to "1" in the area in which there exists disturbance that should be suppressed. The complementary sensitivity function T (s) is set close to zero in the area in which there exists disturbance that should be transmitted. In other words, from the definition of the complementary sensitivity function T (s), disturbance is suppressed completely when the complementary sensitivity function T (s) is "1", and disturbance is transmitted without being suppressed at all when complementary sensitivity function T (s) is zero.

Figure 2:
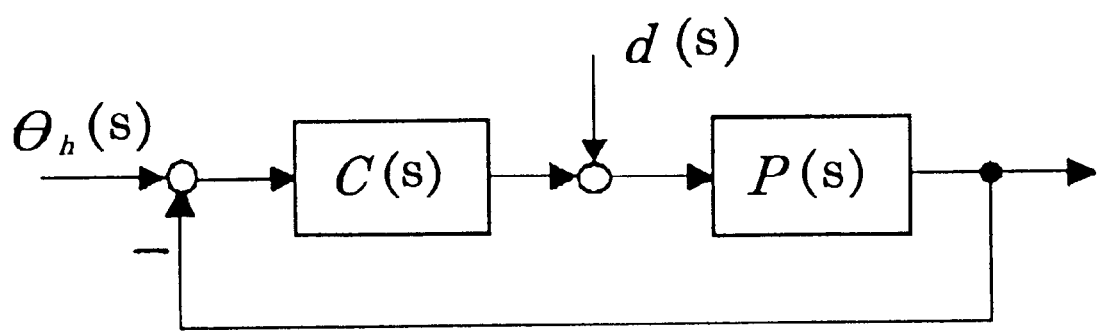
FIG. 2 is a simplified block structure diagram of FIG. 30.
Figure 2:

The complementary sensitivity function is calculated based on the assumption that a vehicle has a simple spring (a spring multiplier Kv) as a transmission characteristic for the vehicle to generate a SAT (self-aligning torque). A constant gain becomes $K/Kv/\alpha^2$. In the band where there exists disturbance to be suppressed, the complementary sensitivity function becomes close to 1. In defining the complementary sensitivity function, FIG. 30 is interpreted as follows. FIG. 30 can be interpreted to show a control system that carries out a control to reduce the displacement of the torsion bar. Reducing the displacement of the torsion bar is equivalent to reducing the steering torque from FIG. 30. Therefore, the control system can be regarded as the one that feeds back $\theta_b$ with $\theta_h$ as a target, and has a control gain K (rigidity of the torsion bar) and the electric power steering. The constant gain of the controller of the electric power steering becomes a gradient of the assist characteristic. Therefore, the constant gain is zero in the area where the torque is small. When a new controller C (s) is provided by combining the rigidity of the torsion bar and the controller, and a steering system is expressed as P (s), the control system can be simplified as a general control system as shown in FIG. 2. The complementary sensitivity function T (s) is expressed by the equation shown in FIG. 2, where d (s) represents the disturbance coming from the tires. This disturbance d (s) includes unnecessary disturbance and a difference between the characteristic of the vehicle and the dynamic characteristics of the spring. Therefore, the object of the complementary sensitivity function T(s) is to transmit the difference between the dynamic characteristics of the simple spring and the actual dynamic characteristics in a suitable band, and to suppress the unnecessary disturbance at the same time.

Figure 3:
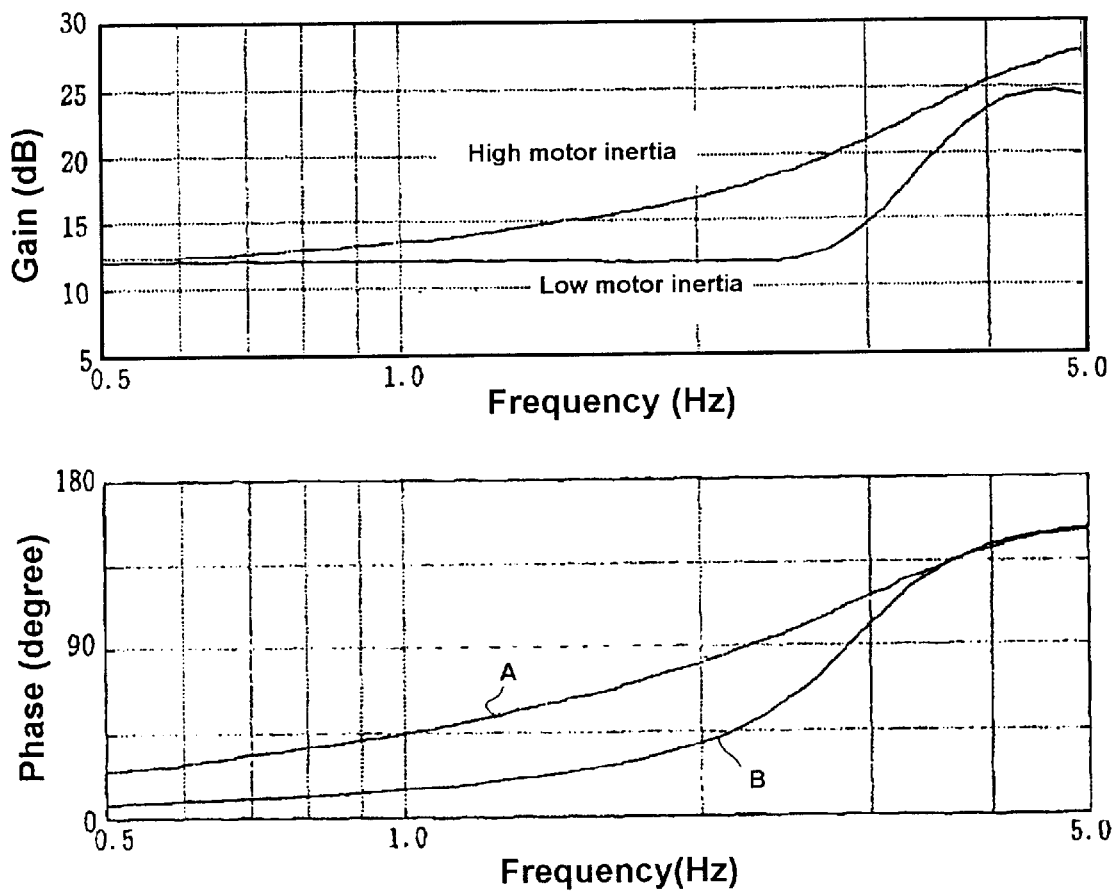
FIG. 3 is a frequency response diagram showing a motor characteristic.

In the present invention, attention has been paid to the difference between the transmission characteristic from the road surface information to the steering torque and the transmission characteristic from the steering angle to the steering torque. The inertia of the motor is positively utilized for unnecessary disturbance, and the inertia of the motor sensed at the time of the steering is compensated for in the torque control system. In a gain diagram shown in FIG. 3, transmission characteristics from the steering angle to the steering torque are compared based on the inertia of the motor (high inertia, and low inertia). From a motor frequency response shown in FIG. 3, it is clear that the influence of the motor inertia appears as a phase delay characteristic. The influence of the motor inertia can be compensated for in the torque control system, by using a phase advance characteristic that becomes an inverse characteristic of the phase delay characteristic. In the phase diagram shown in FIG. 3, a characteristic A shows a case where there is no compensation, and a characteristic B shows a case where there is compensation.

In designing the road surface sensitivity, it is necessary that the torque sensor can detect the road surface information. Therefore, the structure is arranged such that the motor is prevented from interrupting the road surface information. Then, the torque control system is designed such that its complementary sensitivity function comes close to the characteristic shown in FIG. 1. The road surface information generated on the tires is transmitted after the friction component at each element is subtracted. As the motor inertia works as a mechanical low-pass filter, the road surface information is attenuated when the inertia is large. The designing of the complementary sensitivity function is fine-tuned to match the vehicle after sufficiently securing the stability of the control system by applying a general control system designing method. This is because the human sensitivity is subtle, and it is not possible to express ideal characteristic in the transmission characteristic. According to a general designing method that tends to be conservative, it is not possible to take sufficient measure. Consequently, under the current situation, the tuning itself depends on the know-how of the tuning technician.

On the other hand, according to the present invention, in order to realize the complementary sensitivity function shown in FIG. 1, the rolling-type rack and pinion, the rubber damper of the motor reduction gear, the non-contact torque sensor, and the torque control system are improved. These will be explained sequentially below.

Figure 4:
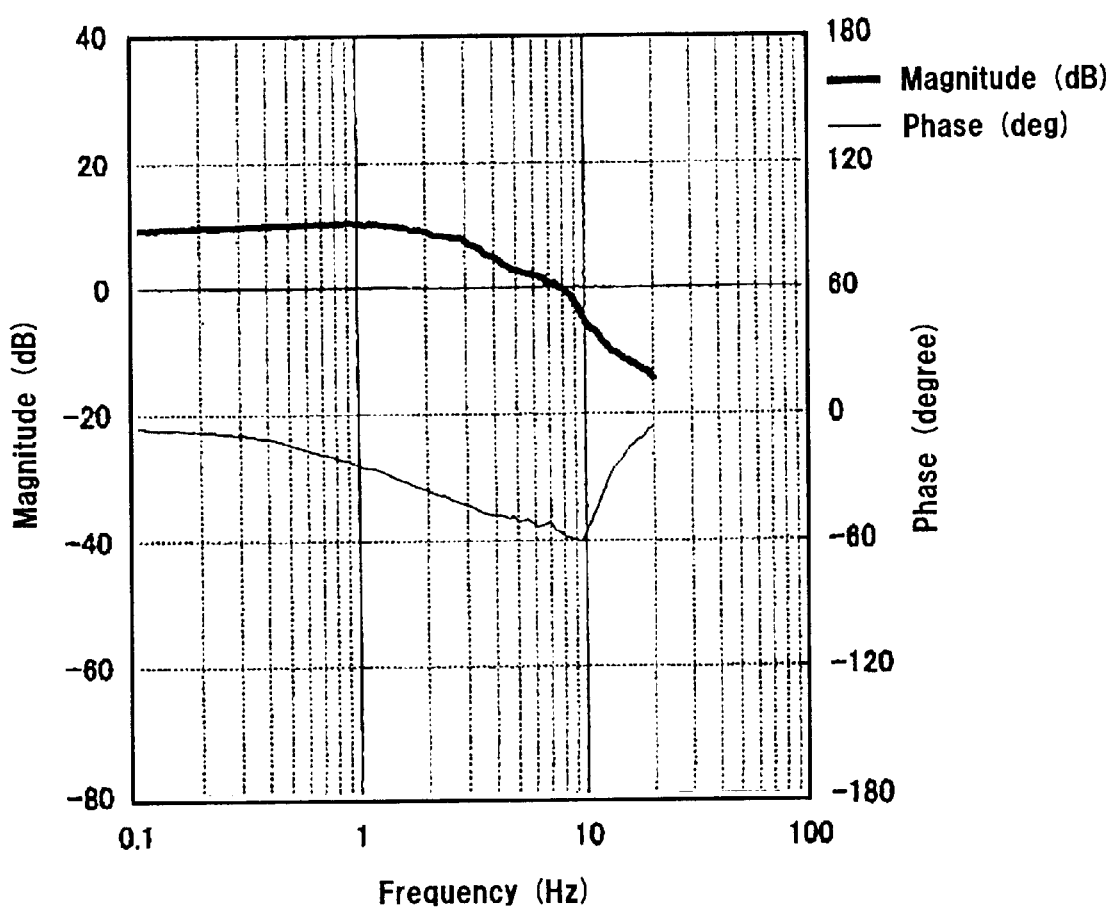
FIG. 4 is a diagram showing an example of a tuning of a transmission characteristic from a road surface input to a steering torque.
Figure 5A:
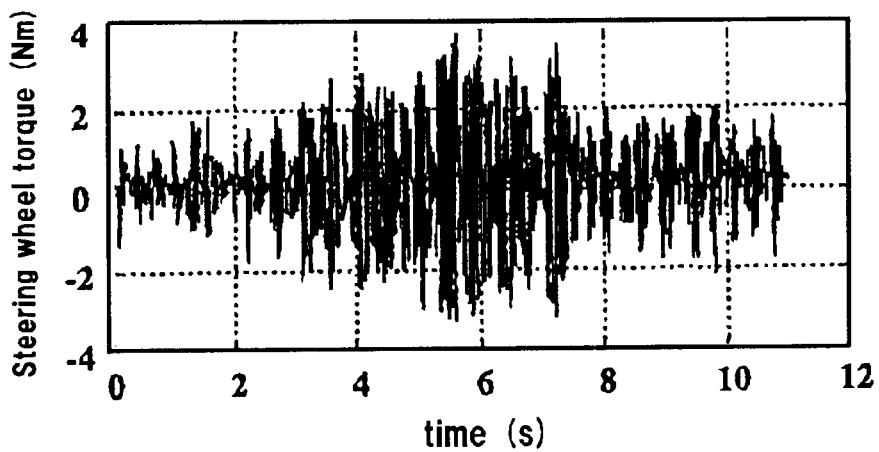
FIGS. 5 (A) and (B) are diagrams showing examples of a measuring of a steering torque (a hydraulic system) when a vehicle has run on a Belgian road.
Figure 5B:
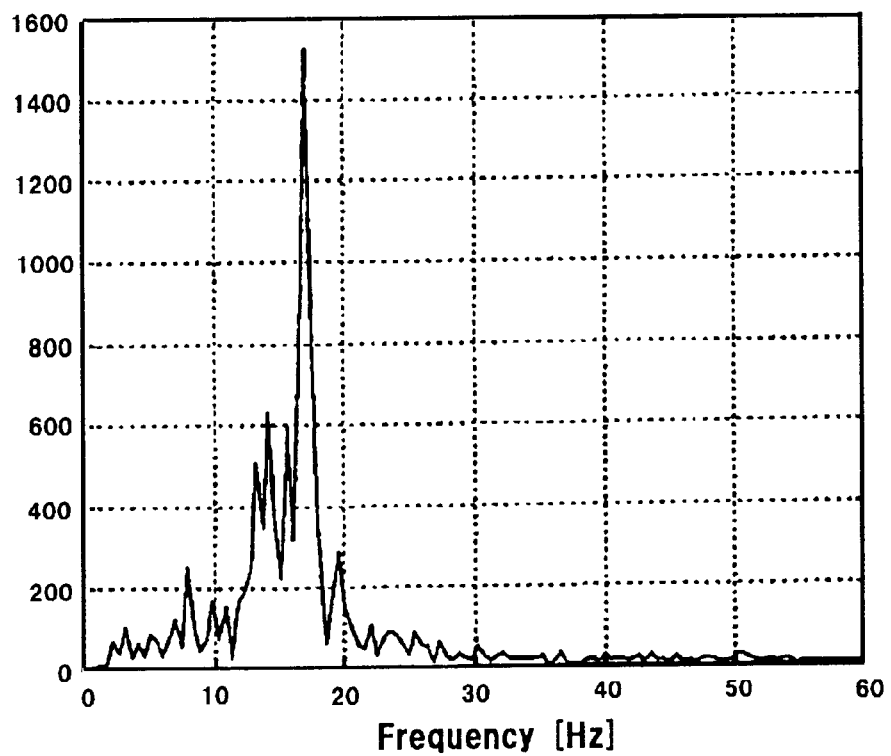
Figure 6A:
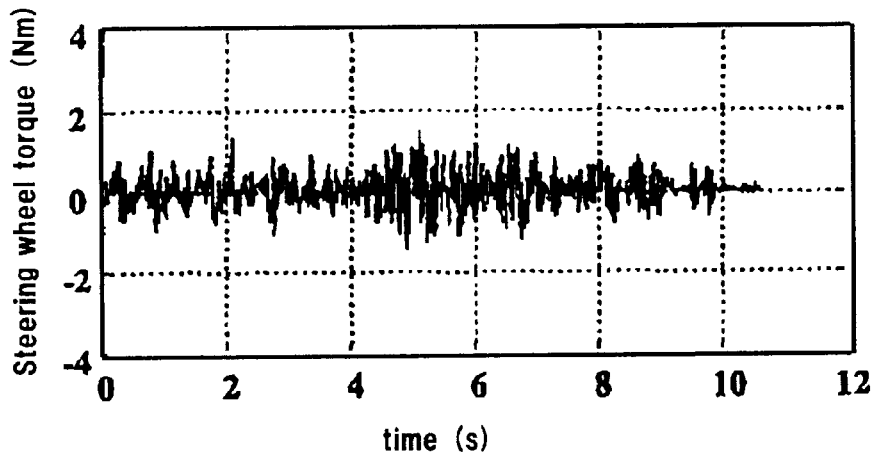
FIGS. 6 (A) and (B) are diagrams showing examples of a measuring of a steering torque (an electric system) when a vehicle has run on a Belgian road.
Figure 6B:
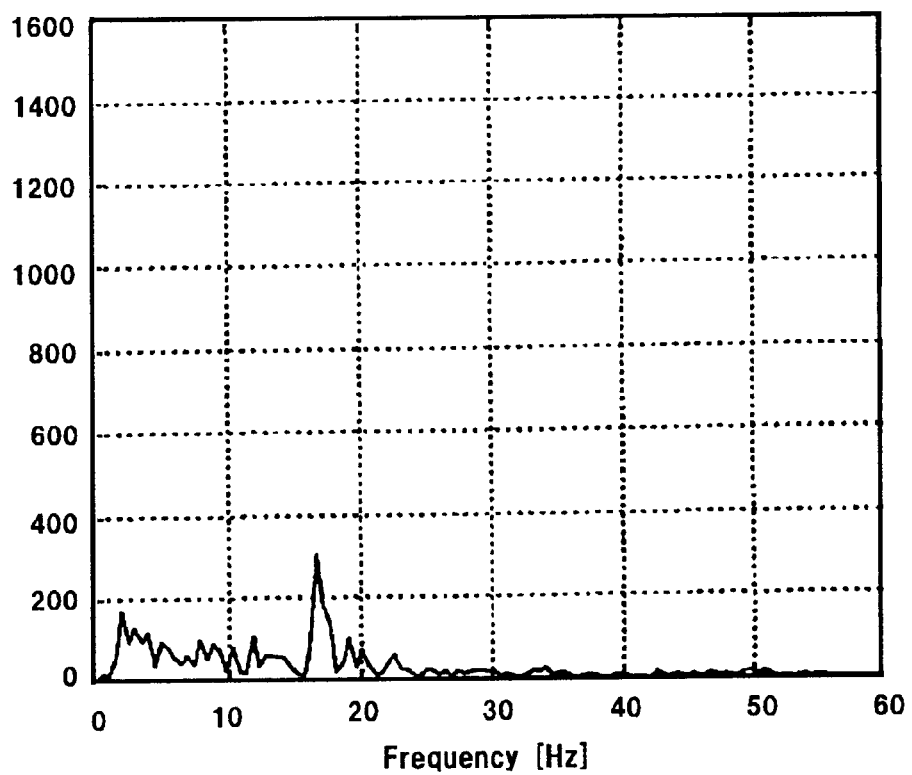
Figure 7A:
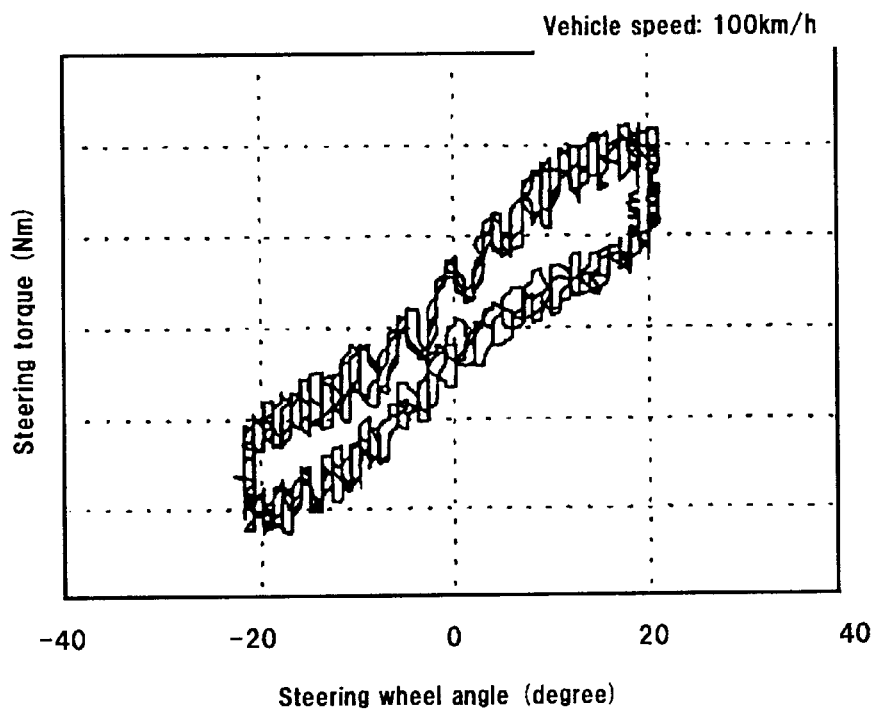
FIGS. 7 (A) and (B) are diagrams showing examples of a steering characteristic when a vehicle has run at 100 Km/h.
Figure 7B:
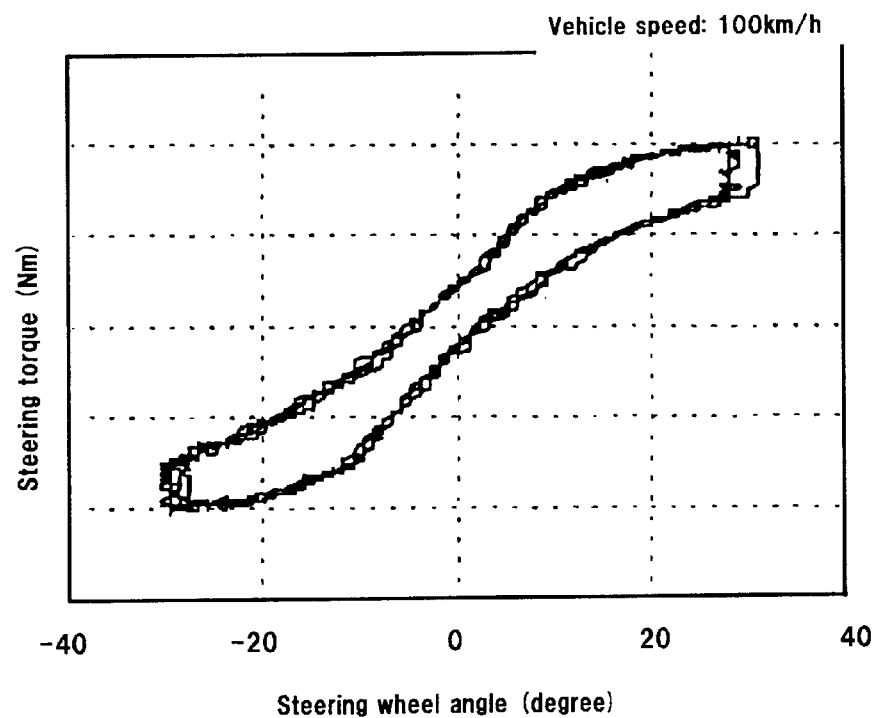

In order to prevent the motor from interrupting the road surface information, the following elements (1) to (3) are effective. (1) Defining a motor characteristic suitable for road surface information by feeding back a status using an observer. (2) De-coupling the motor from the column shaft by employing a mechanical clutch mechanism. (3) Employing a low-friction element. FIG. 4 to FIG. 7 show examples of characteristics of an electric power steering apparatus designed on this basis, in comparison with the characteristics of the hydraulic system. FIG. 4 shows an example of a measurement of tuned road surface sensitivity. A thick line shows sensitivity (dB), and a thin line shows phase (degree). FIG. 5 and FIG. 6 are diagrams showing examples of a measuring of a steering torque of a hydraulic system and a steering torque of an electric system when a vehicle has run on a Belgian road respectively. The reason why the steering torque of the hydraulic power steering apparatus has varied is that the oscillation of the suspension is detected. FIG. 5 (A) and FIG. 6 (A) show variations in the steering torque in relating to time, and FIG. 5 (B) and FIG. 6 (B) show frequency responses in 0 to 60 Hz. FIG. 7 (A) shows an example of a measurement of a steering characteristic (steering torque in relation to steering angle) of the hydraulic power steering apparatus when a vehicle has run at 100 Km/h. FIG. 7 (B) shows an example of a measurement of a steering characteristic (steering torque in relation to steering angle) of the electric power steering apparatus when a vehicle has run at 100 Km/h. The reason why the steering torque of the hydraulic power steering apparatus has varied is that the oscillation of the flutter is detected.

Figure 8:
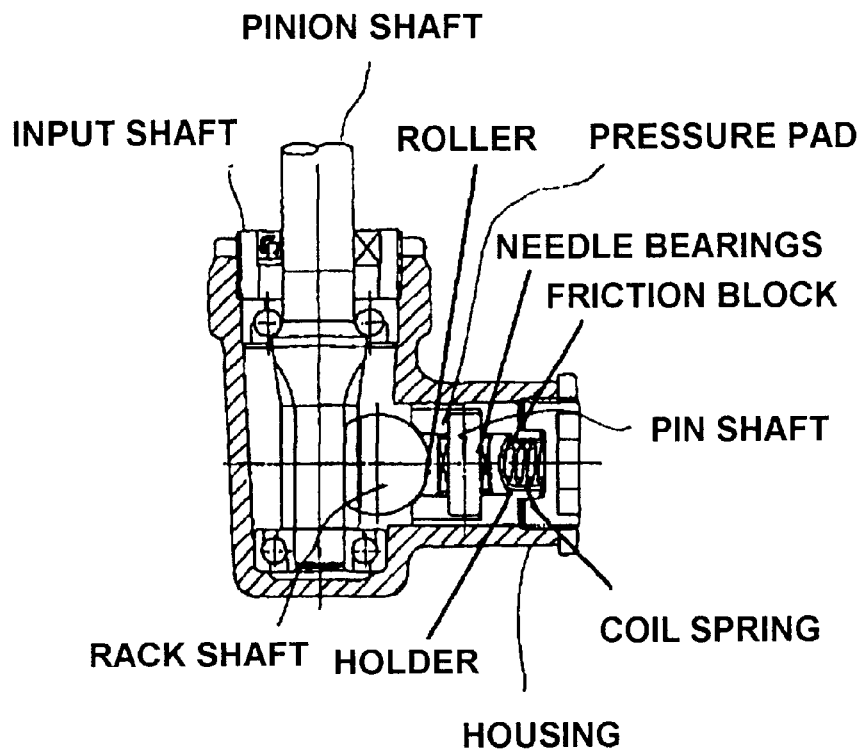
FIG. 8 is a mechanism diagram of a rolling-type rack and pinion that is used in the present invention.
Figure 9:
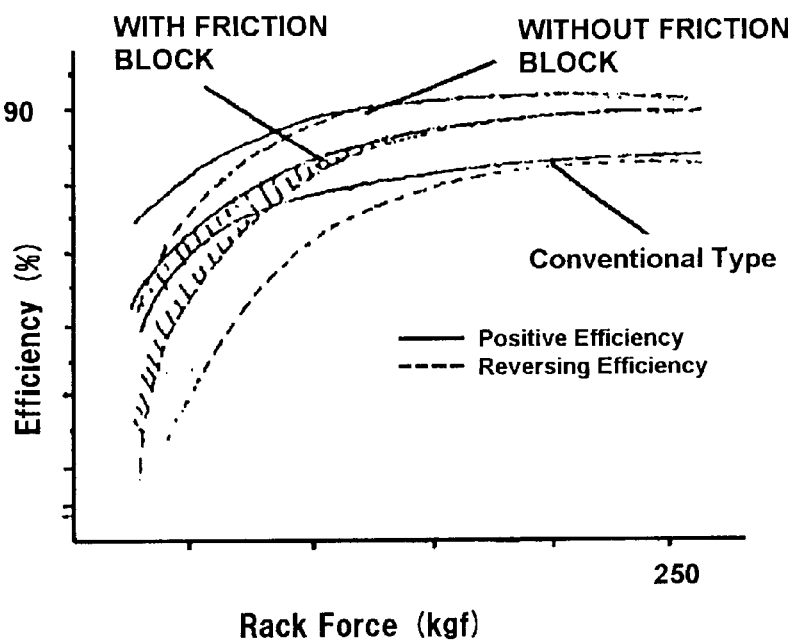
FIG. 9 is a diagram showing an example of a characteristic of the mechanism of FIG. 7 in comparison with that of a conventional apparatus.

FIG. 8 shows a mechanism of a rolling-type rack and pinion that is used in the present invention. FIG. 9 shows a comparison between a characteristic of the mechanism in comparison with that of a conventional mechanism. A pinion shaft is coaxially engaged with an input shaft. The pinion shaft is engaged with a rack shaft. The rack shaft is connected with a pin shaft of a pressure pad within a housing via a roller. The pin shaft is held by needle bearings, and is connected with a coil spring via a friction block. The coil spring is accommodated in a holder, and the pressing force is applied to the pressure pad. The holder is elastically held by a spring suspended between inner walls of the housing. This rolling-type rack and pinion is described in detail in Japanese Patent Application Laid-Open No. 2000-159128 by the present applicant.

Figure 10:
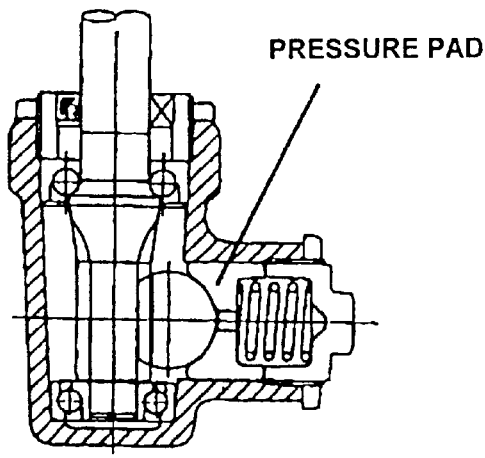
FIG. 10 is a mechanism diagram of a conventional rolling-type rack and pinion.

According to the rolling-type rack and pinion of the present invention, the pressure pad for supporting the pinion consists of the roller, the friction block, the needle bearings, and the holder. Therefore, it is possible to meet both high supporting rigidity and low work resistance. Particularly, as the friction block is disposed in the pressure pad, a reverse input in the area of low rack force is lower than the reverse input according to the conventional rack and pinion mechanism shown in FIG. 10, as is clear from the characteristic diagram shown in FIG. 9. The provision of this friction block is useful for improving the road surface information in the minute steering angle area that is important for the high-speed running. According to the conventional mechanism (having no friction block) shown in FIG. 10, as the friction block is not disposed in the pressure pad, the reverse input becomes high in the area of low rack force.

The rubber damper in the motor reduction gear according to the present invention will be explained next.

Figure 11:
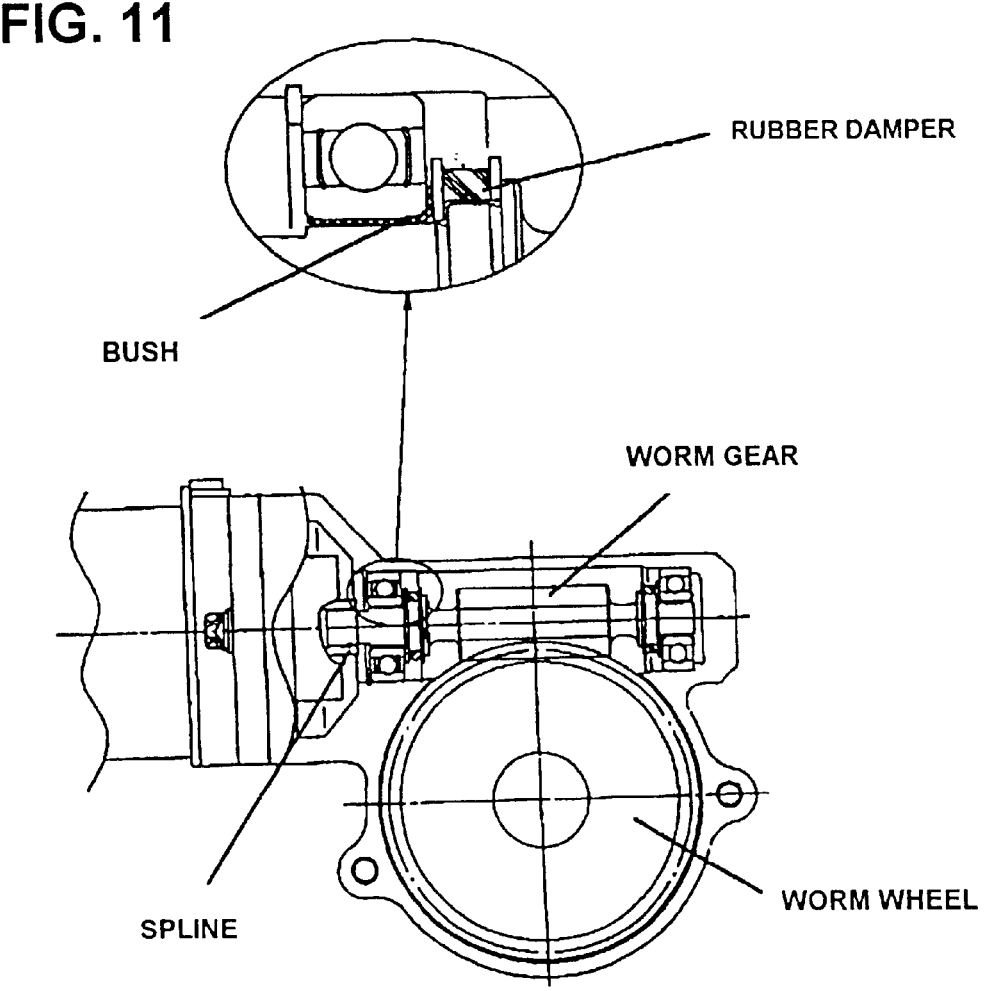
FIG. 11 is a mechanism diagram of a worm shaft supporting section of a motor reduction gear.

As shown in FIG. 11, according to the electric power steering apparatus, a rubber damper (rubber) is inserted into a spline via a bush in the worm shaft supporting section of the motor reduction gear, in order to reduce rattle noise of the gear. In the mean time, in the rubber elastic area, the displacement of the motor and the displacement of the column shaft work independent of each other. Therefore, it is possible to transmit the road surface information to the steering wheel shaft without being interrupted by the friction and the inertia of the motor. As a result, based on this mechanism, it is possible to realize the design of the sensitivity function of the road surface information as shown in FIG. 1. However, the insertion of the rubber damper leads to a high-dimensional structure of the controller, as the control item has dynamic characteristics of a low eigen frequency.

Figure 12:
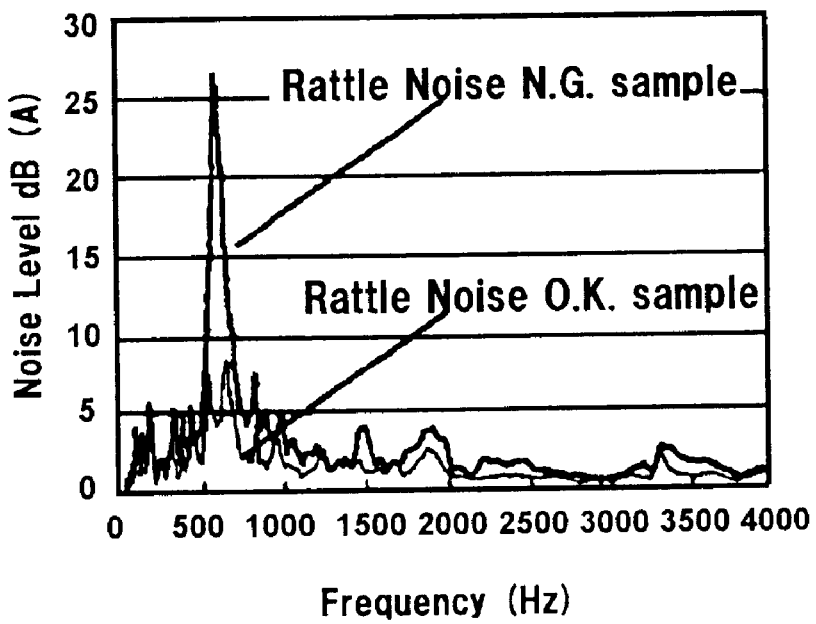
FIG. 12 is a diagram showing a frequency characteristic when a rubber is not mounted on a worm shaft supporting section.
Figure 13:
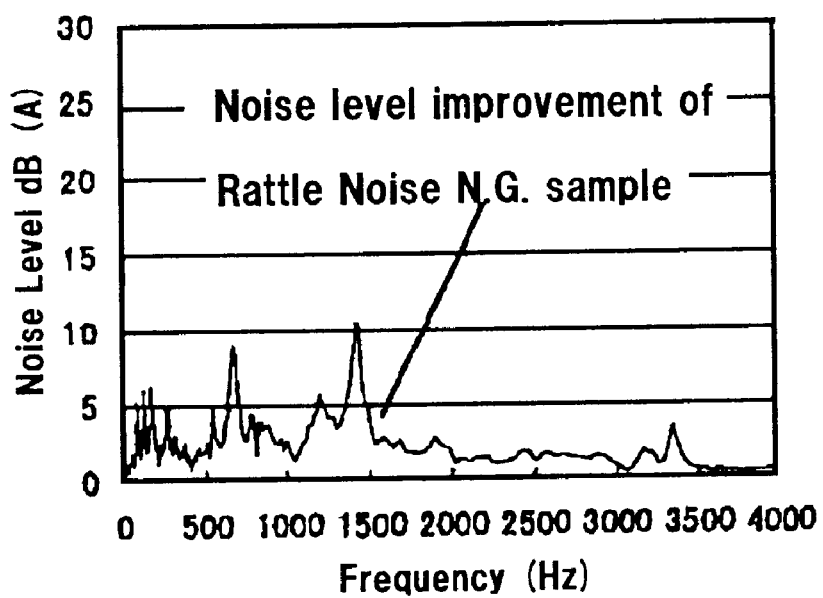
FIG. 13 is a diagram showing a frequency characteristic when a rubber is mounted on a worm shaft supporting section.

FIG. 12 shows a frequency characteristic when a rubber damper is not mounted on a worm shaft supporting section. FIG. 13 shows a frequency characteristic when a rubber damper is mounted on a worm shaft supporting section. It can be understood that the noise level is reduced in the latter case.

The improvement of the torque sensor that is used in the electric power steering will be explained next.

Figure 14:
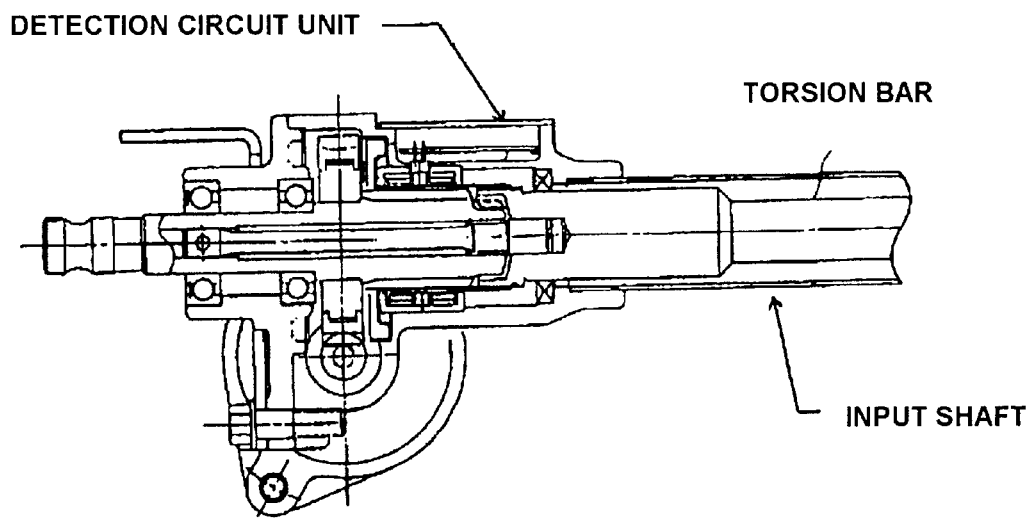
FIG. 14 is a cross-sectional mechanism diagram of a torque sensor that is used in the present invention.
Figure 15:
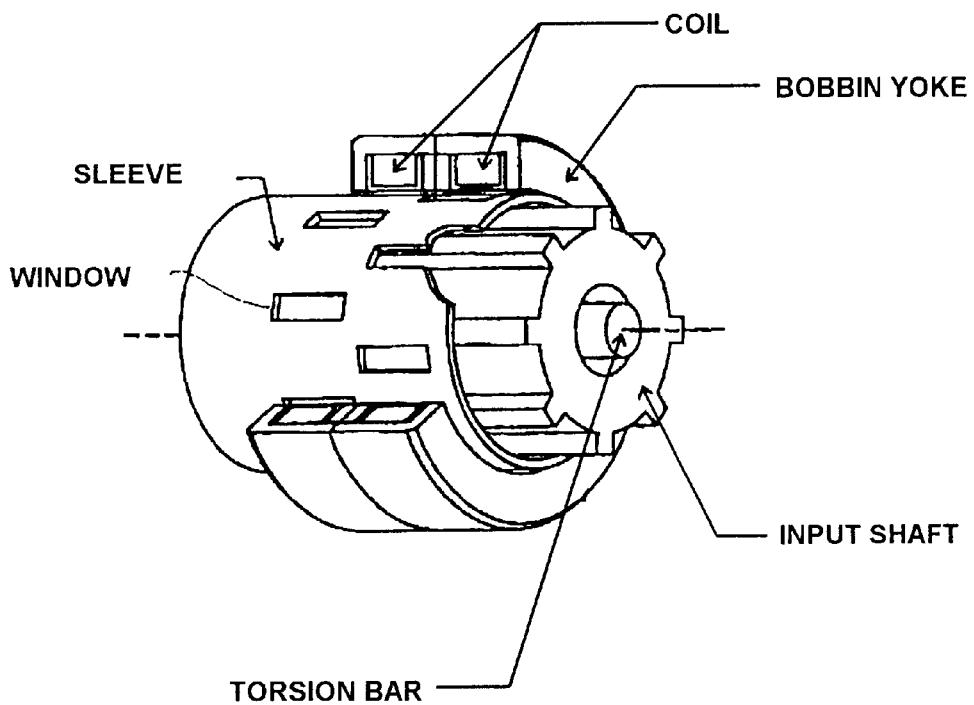
FIG. 15 is a perspective view of a torque sensor that is used in the present invention.

As the hysteresis characteristic of the detection characteristic of the torque sensor appears as a delay characteristic in the fine torque, it is necessary to suppress this hysteresis characteristic as small as possible. For this purpose, according to the present invention, a non-contact torque sensor having a small hysteresis width will be used as shown in FIG. 14 and FIG. 15. FIG. 14 shows a structure that a non-contact torque sensor is disposed in a steering wheel shaft FIG. 15 is a perspective view of a partial cross section of the structure of the sensor. A bobbin yoke forming a detection circuit unit is disposed on a sleeve at the external periphery of an input shaft (a sensor shaft) consisting of a magnetic material like SUS and Fe. Two sets of coils are wound within the bobbin yoke. The sleeve consists of a conductive nonmagnetic material (aluminum, for example). Windows are formed along a ring-shaped coil string. A torsion bar is disposed inside the input shaft.

Based on this structure, the torque to the input shaft is detected in non-contact, by utilizing the conductivity and non-magnetism of the sleeve and the magnetism of the input shaft. In other words, a close status of a periodical magnetic field is generated in the peripheral direction inside the sleeve by utilizing the skin effect. Spontaneous magnetization of the input shaft is increased or decreased based on a phase difference between the phase of the magnetic field and the phase of the spline of the input shaft. A change in the impedance generated based on this operation is detected as a change in the voltage at the coil end by a bridge circuit formed by coils or the like.

The design of the electric control system will be explained next.

For realizing the sensitivity design of the road surface information, the responsiveness of the current control is also an important element. Particularly, it is desirable that the responsiveness around the time of staring a current flow is set as linear as possible from the viewpoint of improving the steering near the neutral point. For linearizing the responsiveness, a robust control is employed based on a standard model, in place of the current control based on a conventional PI controller.

Figure 16:
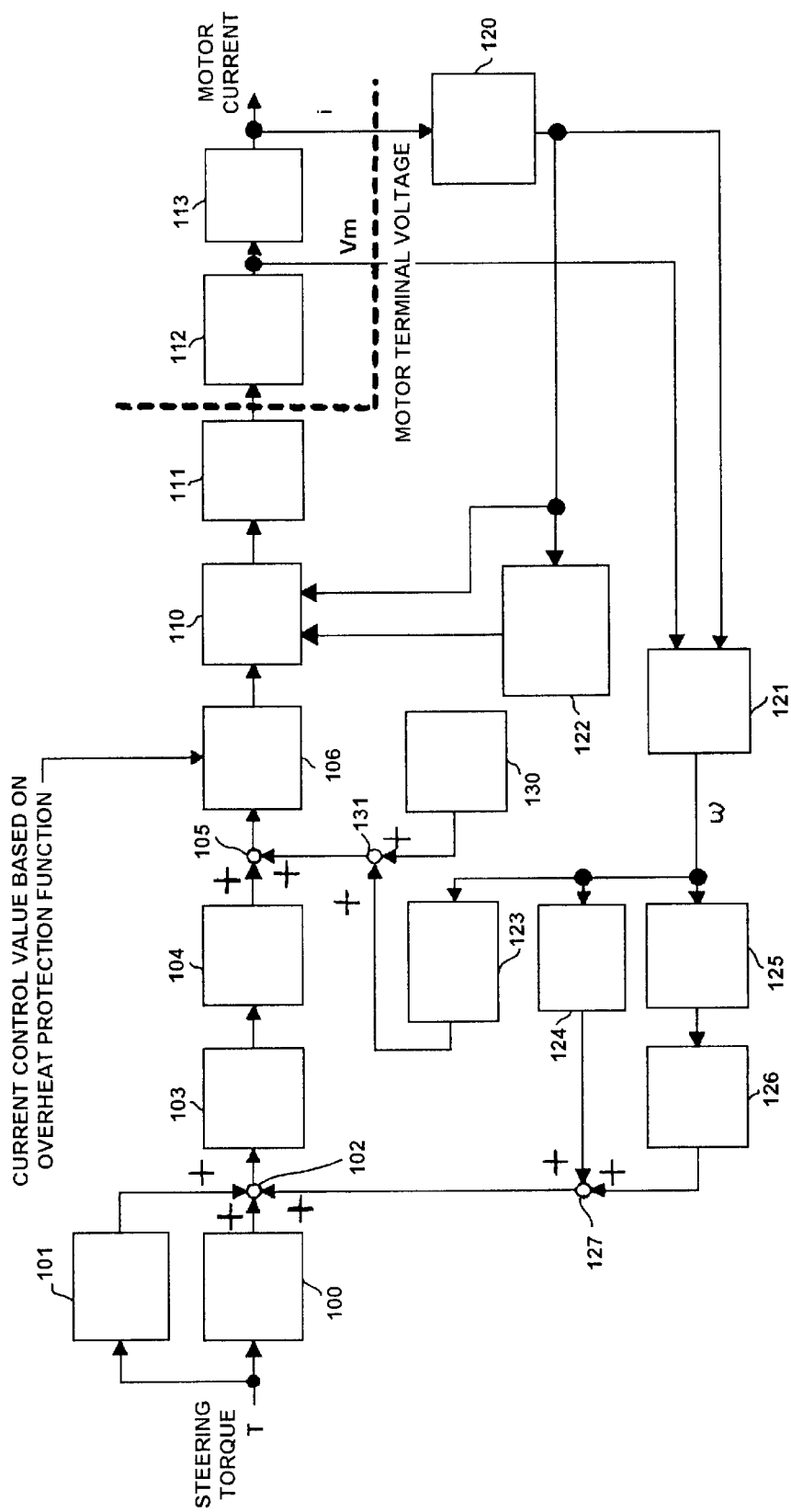
FIG. 16 is a block diagram showing an example of a structure of an electric power steering apparatus according to the present invention.

FIG. 16 is a total block diagram showing control functions of the present invention. A steering torque T is input to a steering auxiliary command value calculating section 100 and a center responsiveness improving section 101. Outputs from these sections are input to an adder 102. A result of an addition by the adder 102 is input to a torque control calculating section 103. An output signal from the torque control calculating section 103 is input to a motor loss current compensating section 104. An output signal of the motor loss current compensating section 104 is input to a maximum current limiting section 106 via an adder 105. A maximum current value limited by the maximum current limiting section 106 is input to a current control section 110. An output of the current control section 110 is input to a current driving circuit 112 via an H bridge characteristic compensating section 111. Based on this, the current driving circuit 112 drives a motor 113.

A motor current i of the motor 113 is input to a motor angular velocity estimating section 121, a current drive switching section 122, and the current control section 110, via a motor current offset correcting section 120. A motor terminal voltage Vm is input to the motor angular velocity estimating section 121. An angular velocity ω estimated by the motor angular velocity estimating section 121 is input to a motor angular velocity estimating section/inertia compensating section 123, a motor loss torque compensating section 124, and a yaw rate estimating section 125. An output of the yaw rate estimating section 125 is input to an astringency control section 126. Outputs of the astringency control section 126 and the motor loss torque compensating section 124 are added by the adder 127. A result of the addition is input to the adder 102. Further, a current dither signal generating section 130 is provided. Outputs of the current dither signal generating section 130 and the motor angular velocity estimating section/inertia compensating section 123 are added by an adder 131. A result of this addition is input to the adder 105.

Figure 17:
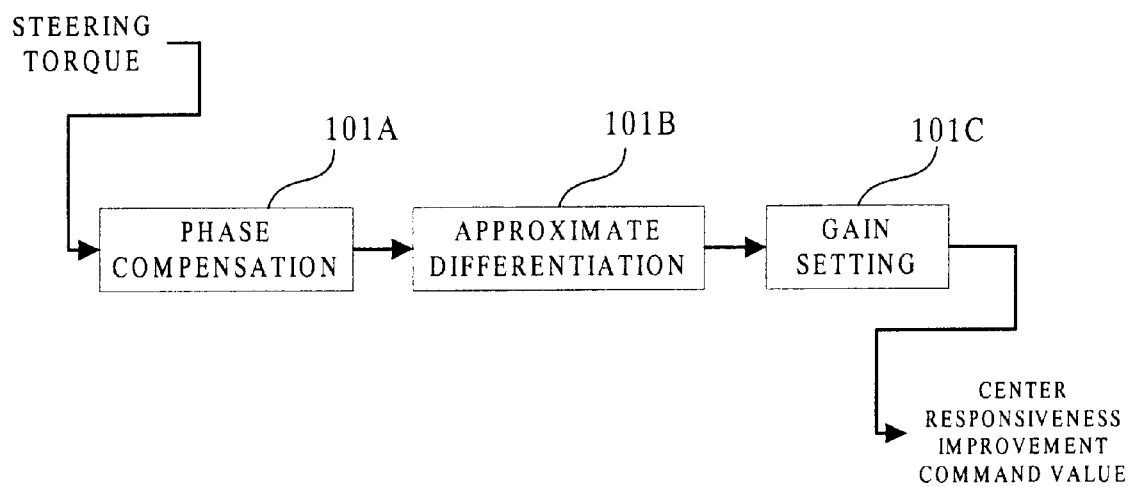
FIG. 17 is a block structure diagram of a center response improving section.
Figure 18:
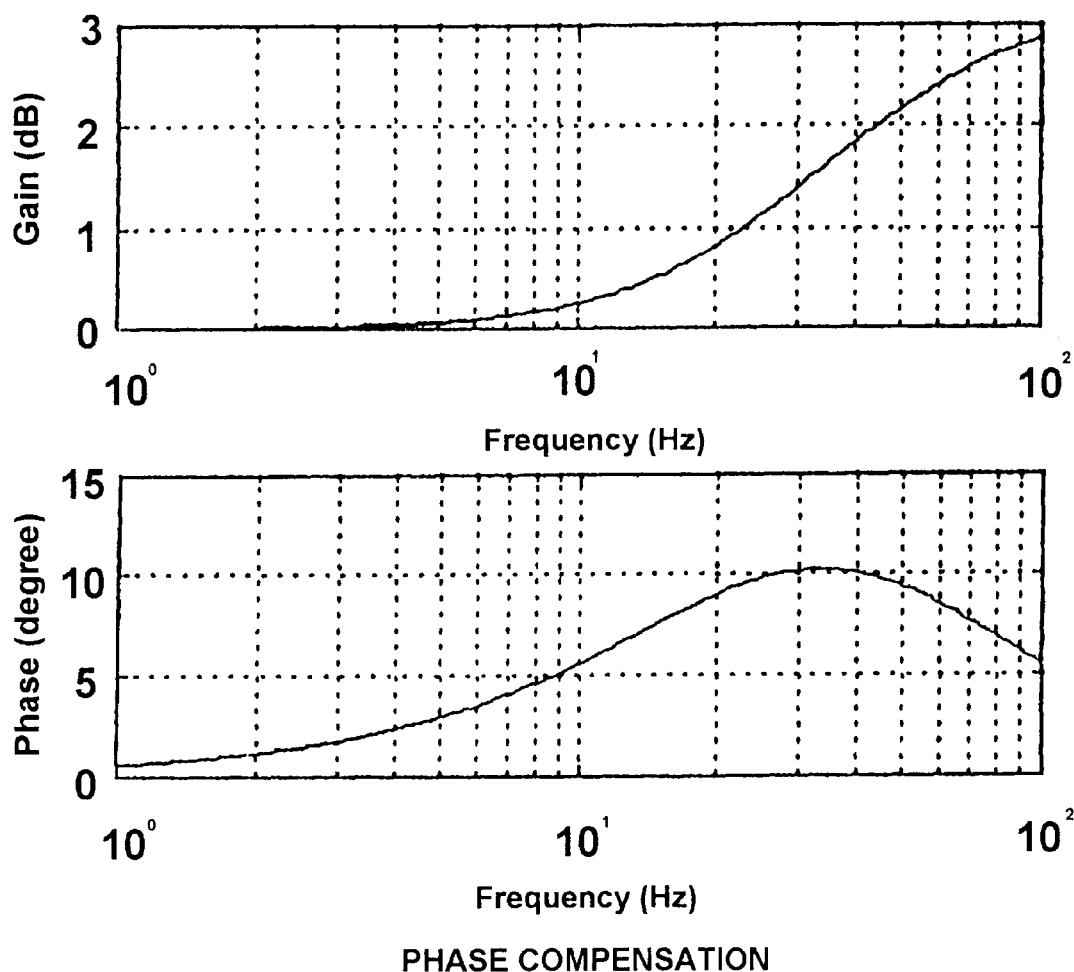
FIG. 18 is a diagram showing an example of a characteristic of a phase compensating section.
Figure 19:
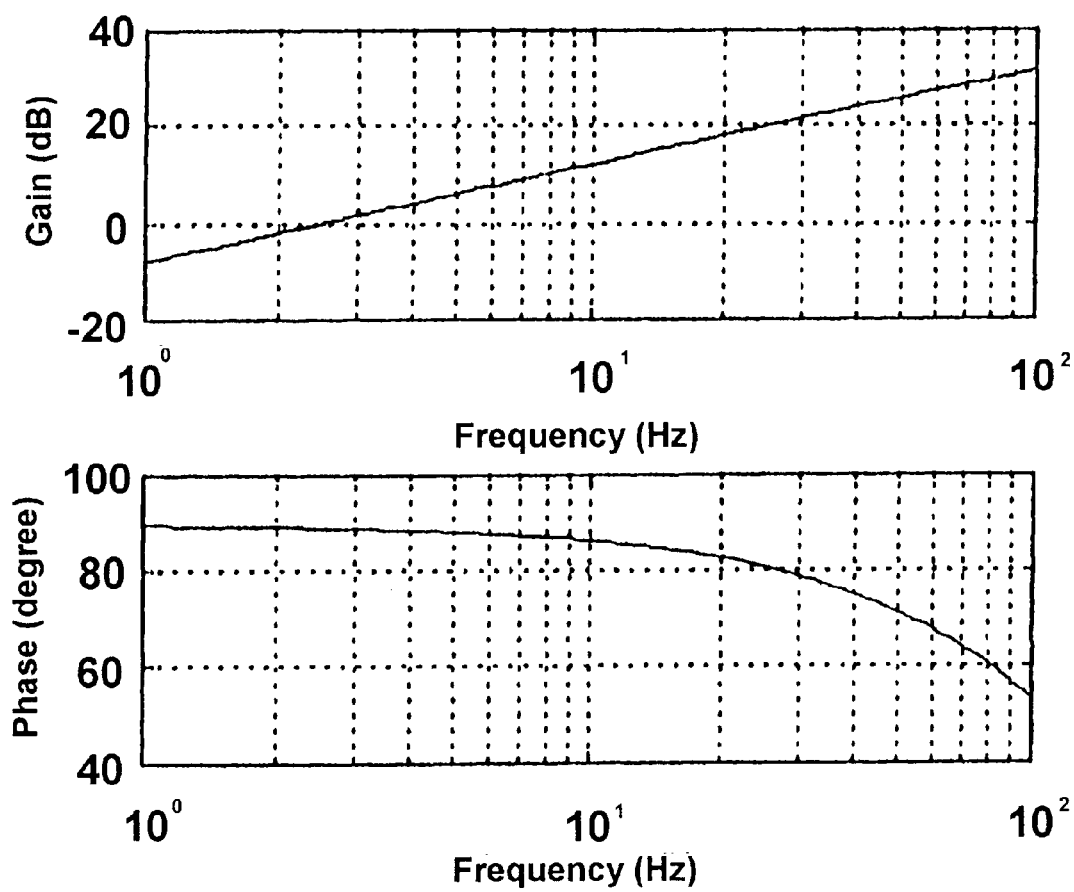
FIG. 19 is a diagram showing an example of a characteristic of an approximate differentiating section.
Figure 20:
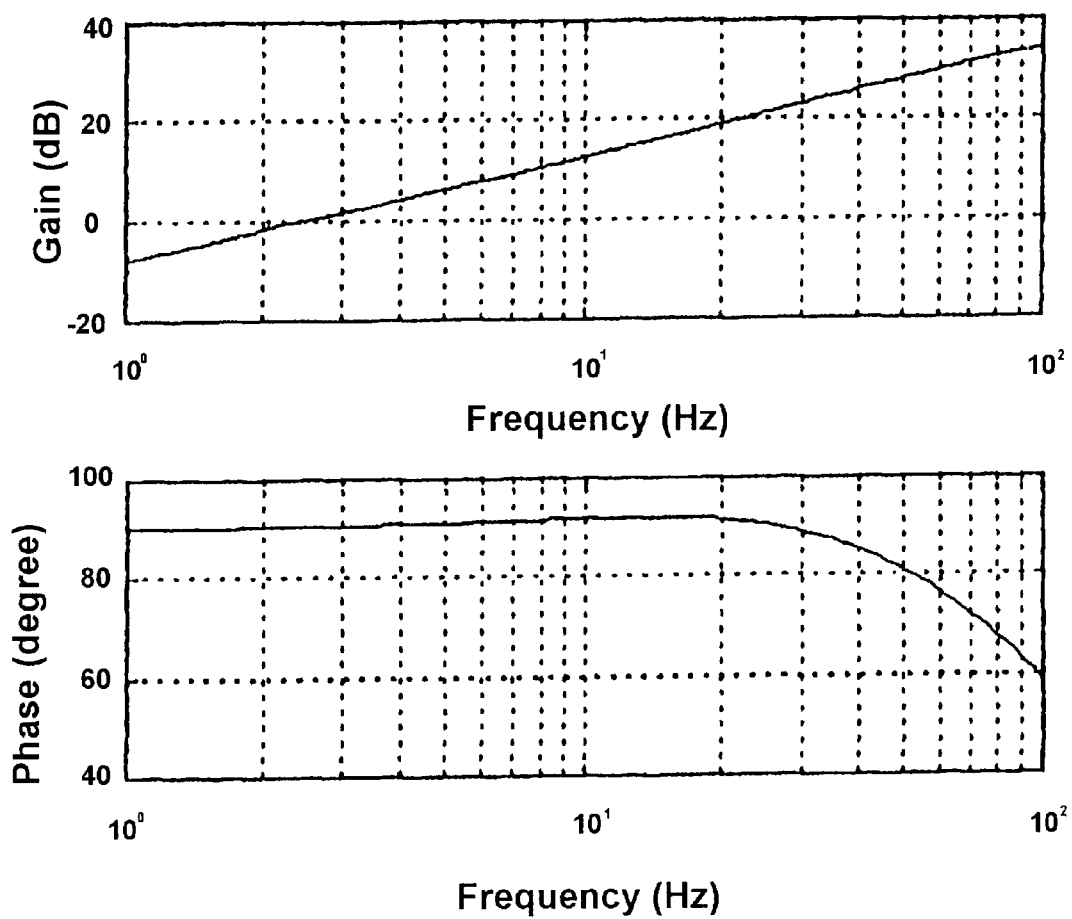
FIG. 20 is a diagram showing a combined characteristic of the phase compensating section and the approximate differentiating section.

Based on the above structure, according to the present invention, the center responsiveness improving section 101 consists of a phase t compensating section 101A, an approximate differentiating section 101B, and a gain setting section 101C, as shown in FIG. 17. Further, the phase compensating section 101A has a frequency characteristic as shown in FIG. 18, and the approximate differentiating section 101B has a frequency characteristic as shown in FIG. 19. With this arrangement, a combined characteristic of the phase compensation and the approximate differentiation becomes as shown in FIG. 20. The gain setting section 101C sets the gain by switching the vehicle speed V and the steering torque T as shown in FIG. 21. Further, in order to reduce the unstable steering feeling that the steering wheel is suddenly returned, and to stabilize the steering, the steering torque is increased, the steering torque change rate is increased, and the gain is decreased when the steering torque is in the decreasing direction. In other words, the switching condition is set as follows. |steering torque| (=A)> about 1.37 Nm, |steering torque−steering torque (one sampling before)| (=B) >about 0.137 Nm, and sign (A)<>sign (B). The gain after the switching is "46" at the vehicle speed 0 to 2, "47" at the vehicle speed 4 to 78, and "41" at the vehicle speed 80 or above, for example. In the above, sign (A)< > sign (B) means that the signs of (A=steering torque) and (B=steering torque−steering torque (one sampling before)) are different.

Figure 22:
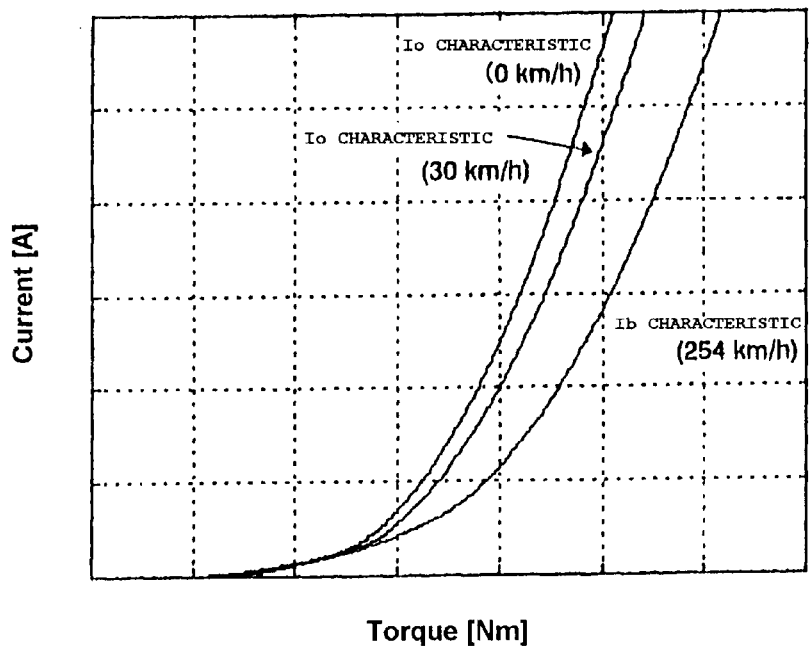
FIG. 22 is a diagram showing a basic assist characteristic.
Figure 23:
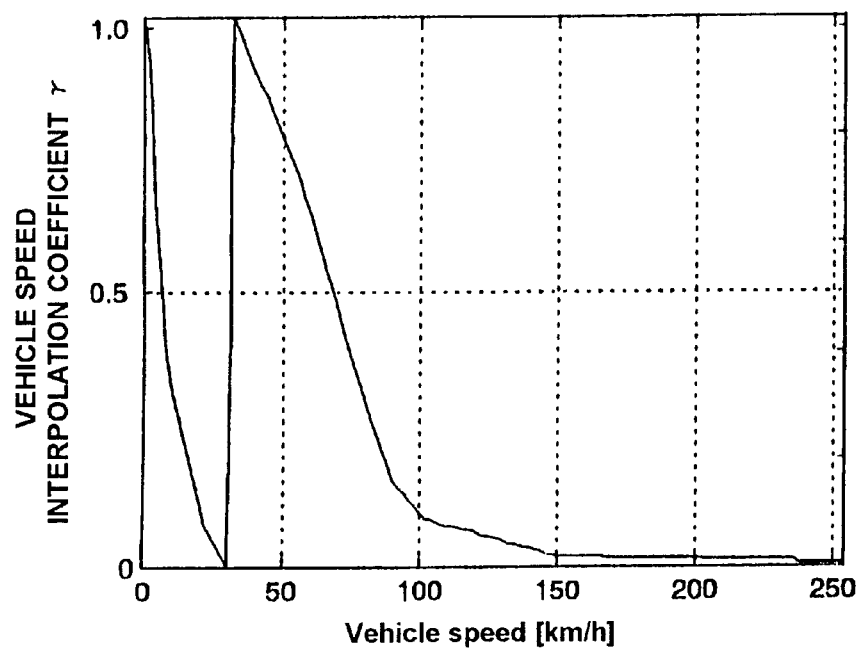
FIG. 23 is a diagram showing an example of a vehicle speed interpolated calculation.

Further, according to the present invention, the steering auxiliary command value calculating section 100 sets the assist characteristic of three representative vehicle speeds (0, 30, 254 Km/h) as a basic characteristic in the calculation of the assist value. The steering auxiliary command value calculating section 100 calculates the assist values at other speeds by interpolating between the basic characteristics for every 2 Km/h of the vehicle speed according to the vehicle interpolation gain. Then, the vehicle speed of the assist characteristic is set to a range from 0 to 254 Km/h, and the resolution is set as 2 Km/h. FIG. 22 shows the basic assist characteristic (torque versus current). The basic assist characteristic is expressed as 0 Km/h=1o characteristic, 30 Km/h=1a characteristic, and 254 Km/h=1b characteristic. For other vehicle speeds, the assist current is calculated by interpolating between the vehicle speeds for every 2 Km/h using a vehicle (Km/h) versus vehicle speed interpolation coefficient γ shown in FIG. 23. When the vehicle speed is from 0 to 30 Km/h, the assist current I is I=1a (T)+γ (V)(1o(T)−1a (T)). When the vehicle speed is from 32 to 254 Km/h, the assist current I is I=1b(T)+γ (V)(1a(T)−1b(T)).

Figure 24:
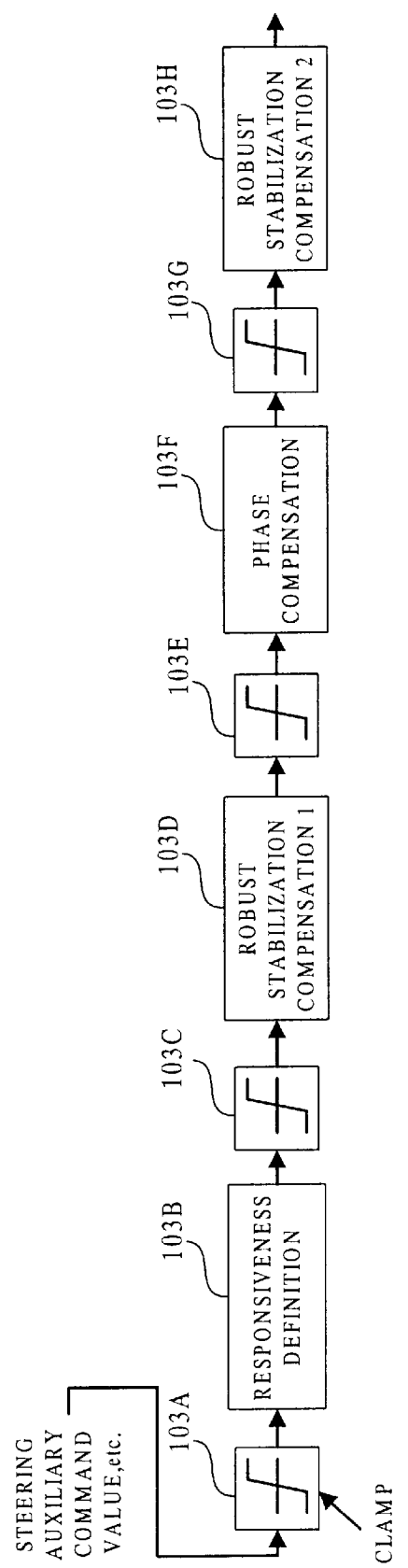
FIG. 24 is a block diagram showing an example of a structure of a torque control calculation.

Further, according to the present invention, the torque control calculating section 103 sets a steering torque response for stabilizing the mechanical system of the electric power steering apparatus, stabilizing the oscillation of the rubber damper at the reduction gear, and adjusting the steering feeling. FIG. 24 shows this structure. A responsiveness defining section 103B is provided at the rear stage of a clamp circuit 103A. At the rear stage of the responsiveness defining section 103B, a robust stabilization compensating section 103D is disposed via a clamp circuit 103C. At the rear stage of the robust stabilization compensating section 103D, a phase compensating section 103F is provided via a clamp circuit 103E. Further, a robust stabilization compensating section 103H is disposed via a clamp circuit 103G.

Figure 25:
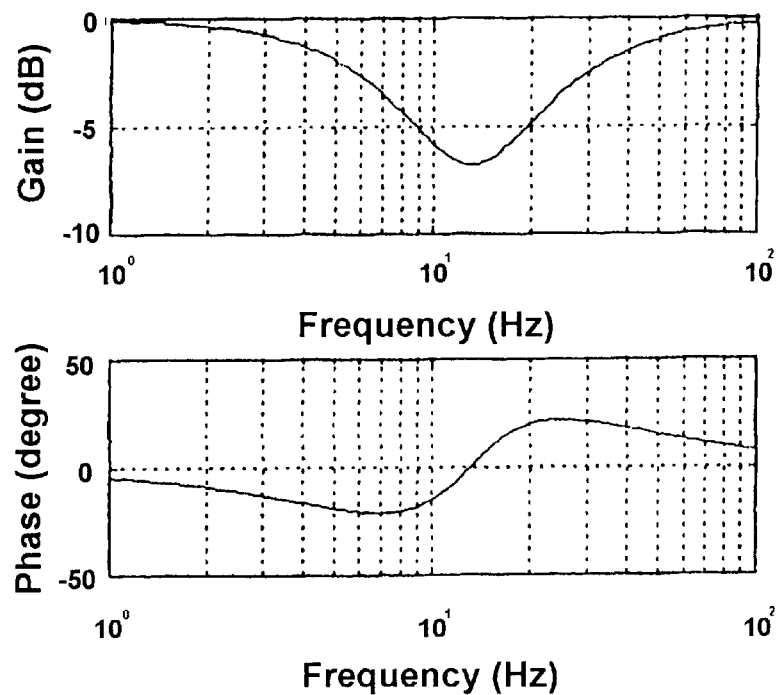
FIG. 25 is a diagram showing an example of a characteristic of robust stabilization compensation.
Figure 26:
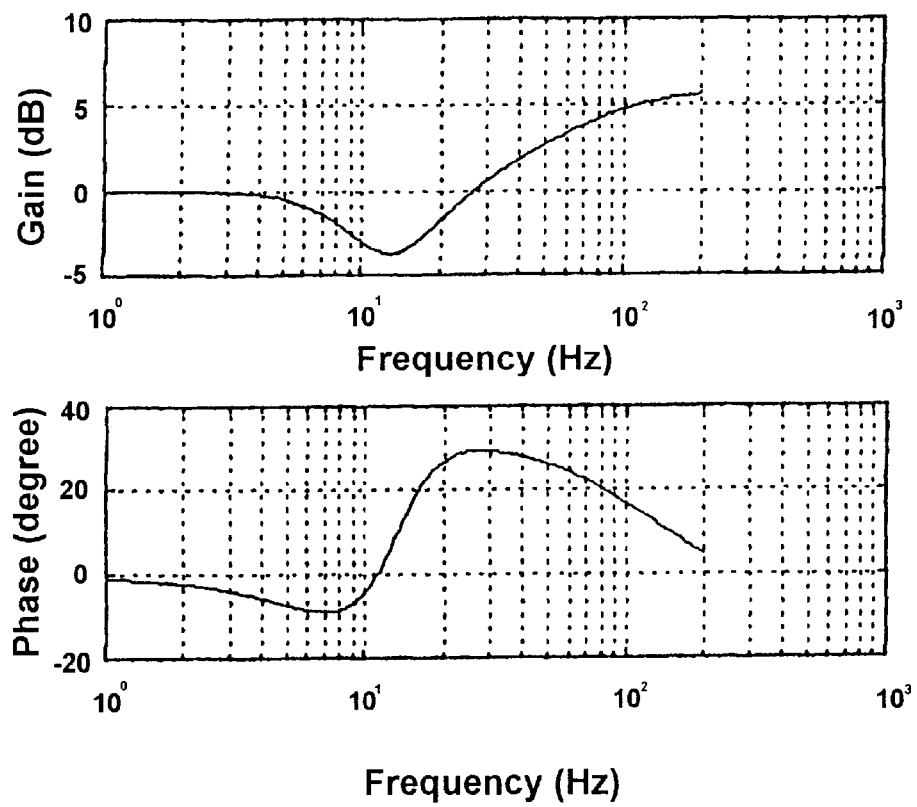
FIG. 26 is a diagram showing an example of a characteristic of a control system.
Figure 27:
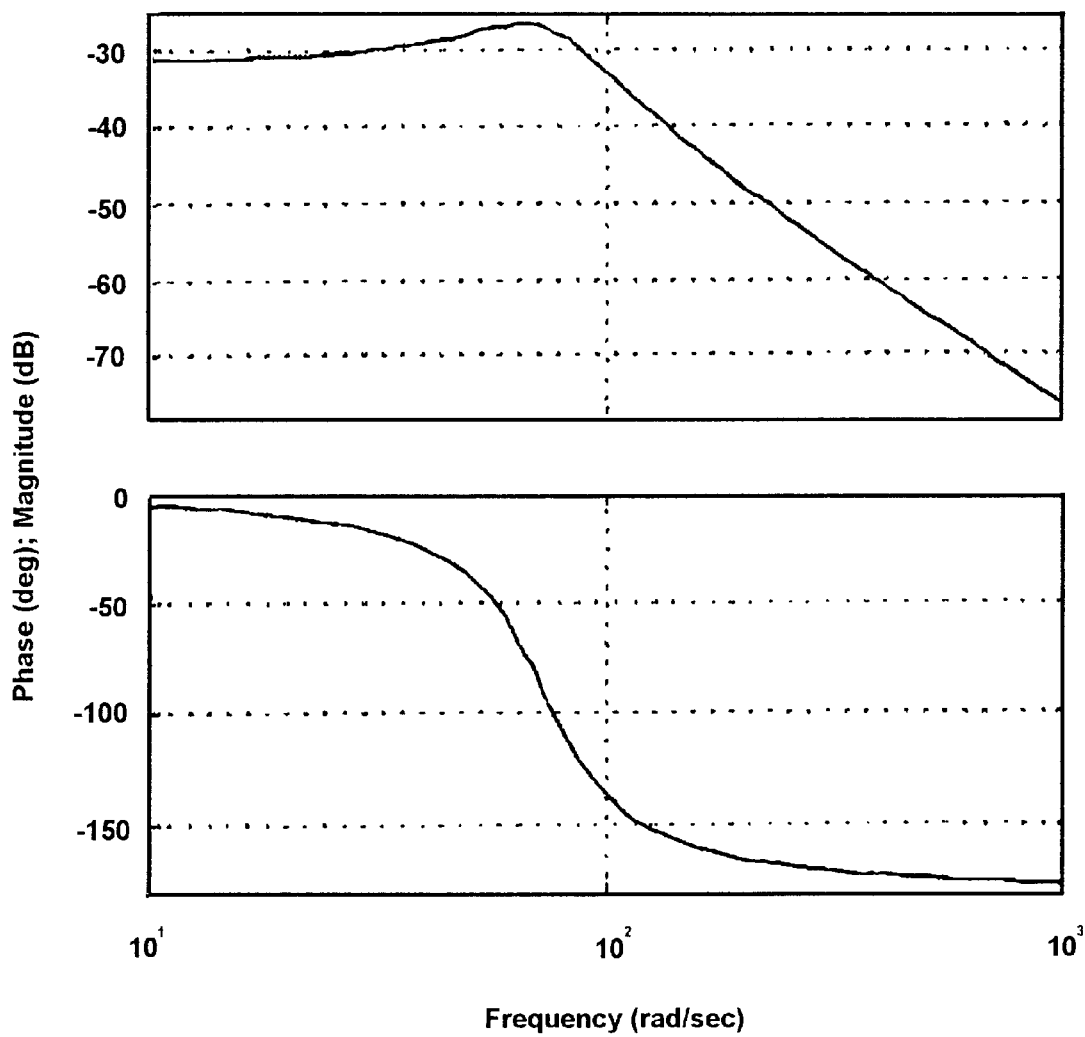
FIG. 27 is a diagram showing an example of a characteristic of a mechanical system.
Figure 28:
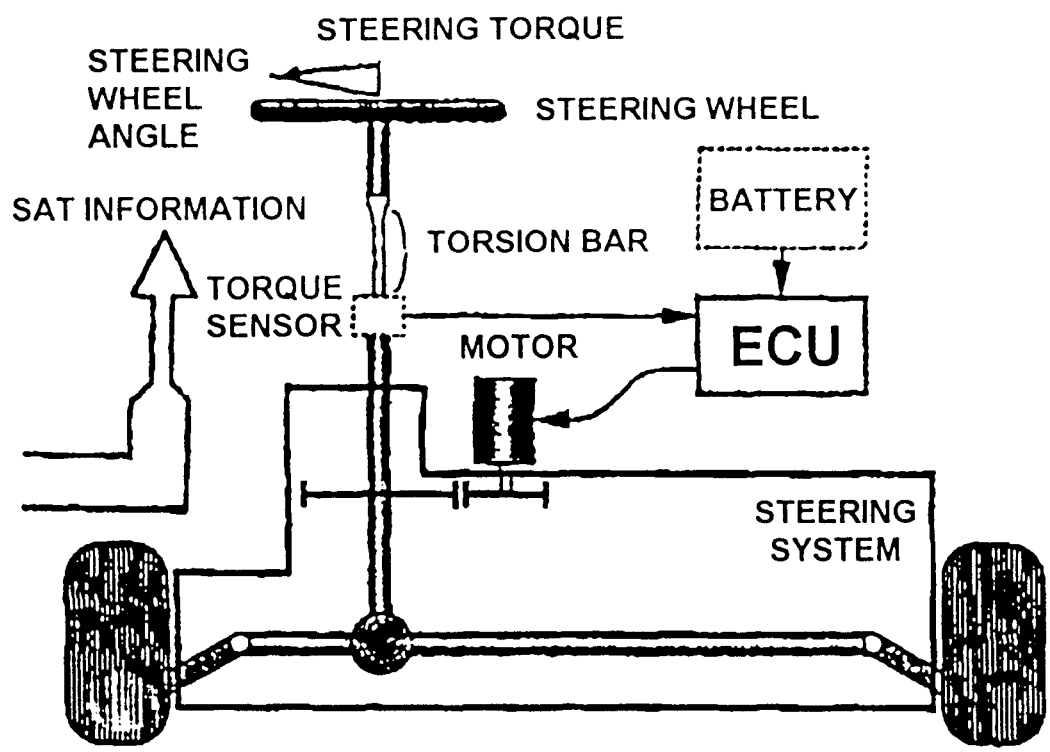
FIG. 28 is a mechanism diagram showing a general example of an electric power steering.
Figure 29:
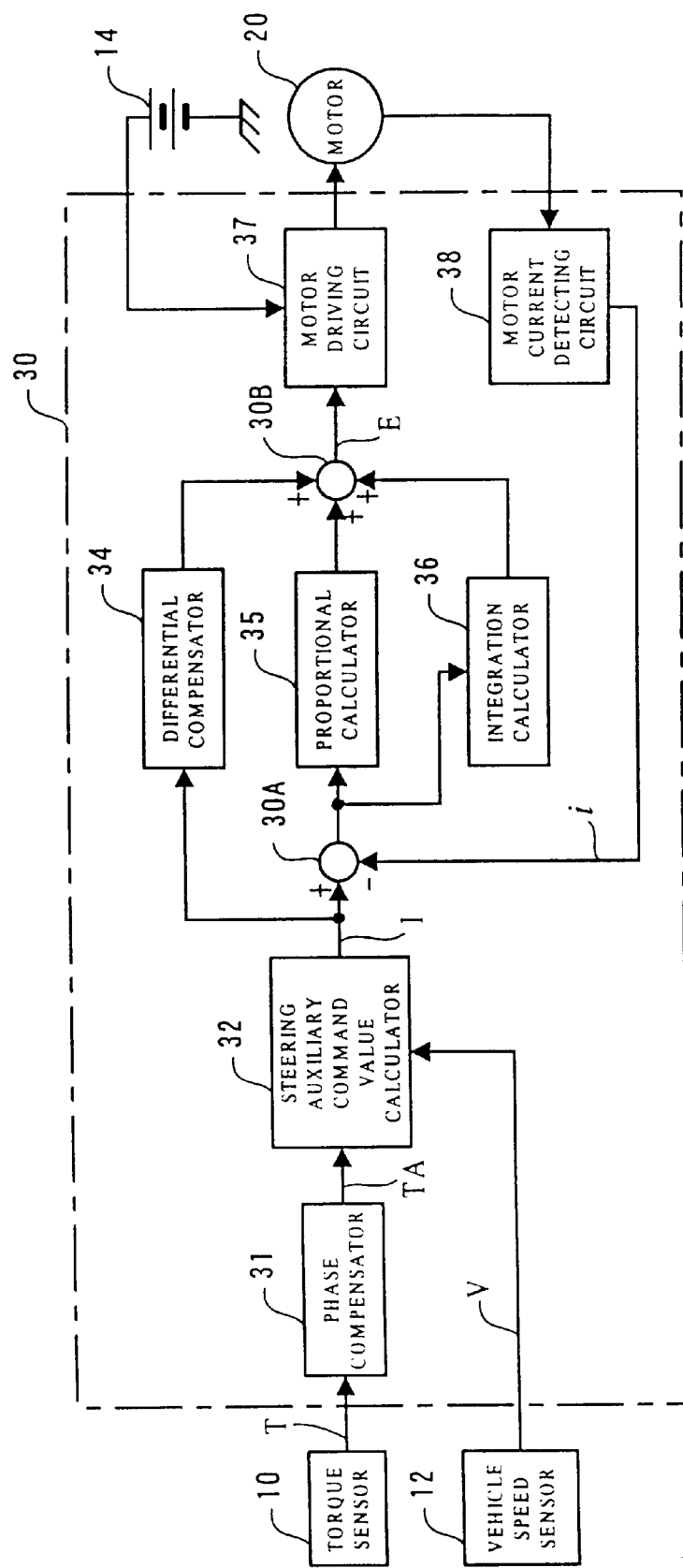
FIG. 29 is a block diagram showing a general internal structure of a control unit.

FIG. 25 shows a characteristic of the robust stabilization compensating section 103H, and FIG. 26 shows a total characteristic of the control system. FIG. 27 shows a characteristic of the mechanical system. In total, the crest and trough are cancelled, and a substantially flat characteristic is obtained.

Further, according to the present invention, in order to improve the start-up from the motor output torque 0 by adding, a current that does not appear as a motor output even when the motor current flows is set, as a tuning of the center feeling. For this purpose, the compensation value is added to have the same sign as the sign of the torque control calculation output. The compensation value is switched at four stages based on the vehicle speed.

INDUSTRIAL APPLICABILITY

As described above, according to the present invention, a desirable complementary sensitivity function is obtained from the road surface information, and the mechanical system and the current control system are designed based on the complementary sensitivity function. Therefore, it is possible to prevent an unnatural steering feeling, and obtain a comfortable steering feeling.

What is claimed is:

1. A control unit for an electric power steering apparatus that controls a motor for giving steering auxiliary force to a steering mechanism, the control unit comprising:

a calculating section that calculates a steering auxiliary command value, wherein the calculation is based on steering torque generated in a steering shaft and on a complementary sensitivity function, wherein the complementary sensitivity function relative to a frequency is set to a level that approaches 1 in a band in which disturbance to be suppressed exists, and is set to a level that approaches 0 in a band in which disturbance to be transmitted exists; and a control section that calculates a current control value for controlling the motor, wherein the calculation of the current control value is based on the steering auxiliary command value, and on a current value of the motor;

wherein an eigenvalue of the power steering apparatus that is set to 10 to 13 Hz, an eigenvalue of suspension that is set to 13 to 17 Hz, a flutter oscillation area that is set to 15 to 25 Hz, and a motor torque ripple area that is set to 15 to 30 Hz, are included in the band in which the disturbance to be suppressed exists.

2. The control unit for an electric power steering apparatus described in claim 1, wherein the complementary sensitivity function is obtained form a design of a mechanical control system and an electric control system.

3. The control unit for an electric power steering apparatus described in claim 2, wherein the mechanical control system is obtained from designs of a rolling-type rack and pinion mechanism, a rubber damper of a motor reduction gear mechanism, and a non-contact torque sensor.

* * * * *